United States Patent [19]
Murray et al.

[11] Patent Number: 5,313,991
[45] Date of Patent: May 24, 1994

[54] APPARATUS FOR CONTAINING OIL AND WASTE SPILLS AT A LOADING AND UNLOADING LINE CONNECTION

[75] Inventors: Bill D. Murray; Jack G. Brewer, both of Chickasha, Okla.

[73] Assignee: Pollution Control, Inc., Chickasha, Okla.

[21] Appl. No.: 19,168

[22] Filed: Feb. 2, 1993

[51] Int. Cl.$^5$ .............................................. F16L 55/00
[52] U.S. Cl. .................................... 141/86; 141/98; 220/571; 137/312; 73/46
[58] Field of Search ................. 141/86, 88, 98, 311 A; 220/571, 203, 209, 300, 375, 627, 661; 137/236.1, 312-314, 363-372, 375, 592, 360; 60/455; 184/106; 405/52; 222/108-111; 73/46, 49.1-49.3

[56] References Cited

U.S. PATENT DOCUMENTS

| | | | |
|---|---|---|---|
| 441,141 | 11/1890 | Dalton | 137/312 |
| 968,711 | 8/1910 | Stevenson | 137/360 X |
| 2,160,285 | 5/1939 | Routh | 141/86 X |
| 2,176,399 | 10/1939 | Garrett | 137/371 X |
| 2,295,514 | 9/1942 | Brinkman | 220/661 X |
| 2,438,245 | 3/1948 | Gregg | 137/312 |
| 2,497,969 | 2/1950 | Anderson | 137/364 X |
| 2,954,797 | 10/1960 | Dryer | 73/46 X |
| 3,110,157 | 11/1963 | Radd | 137/312 |
| 3,187,964 | 6/1965 | Foster . | |
| 3,562,969 | 2/1971 | Little, Jr. | 137/363 X |
| 3,712,330 | 1/1973 | Davis | 137/312 |
| 3,721,270 | 3/1973 | Wittgenstein | 73/49.1 X |
| 3,871,401 | 3/1975 | Lyons | 137/381 |
| 4,493,344 | 1/1985 | Mathison et al. | 138/89 |
| 4,819,677 | 4/1989 | Stern | 134/104.2 |
| 4,871,084 | 10/1989 | Robbins | 220/85 F |
| 4,896,705 | 1/1990 | Podgers et al. | 141/86 |
| 4,912,966 | 4/1990 | Sharp | 73/49.2 T |
| 4,960,346 | 10/1990 | Tamayo | 405/52 |
| 5,002,101 | 3/1991 | McLeod | 141/83 |
| 5,058,633 | 10/1991 | Sharp | 141/86 |
| 5,060,509 | 10/1991 | Webb | 73/40.5 R |
| 5,071,166 | 12/1991 | Marino | 220/571 X |
| 5,101,869 | 4/1992 | Myers | 141/339 |
| 5,152,635 | 10/1992 | Ziu | 405/52 |

FOREIGN PATENT DOCUMENTS

| | | | |
|---|---|---|---|
| 4119115 | 9/1979 | Japan | 137/312 |
| 9133444 | 7/1984 | Japan | 73/46 |

OTHER PUBLICATIONS

Exhibit A-Sales Invoice dated Mar. 12, 1992.
Exhibit B-News Article-Ronda Rears, "Chickasha Firm Develops Oil Spill Preventer", The Journal Record, Apr. 22, 1992, p. 10.

Primary Examiner—J. Casimer Jacyna
Attorney, Agent, or Firm—Craig Wayne Roddy

[57] ABSTRACT

An oil and waste line connection spillage containment apparatus, constructed from non-corrosive and rust-proof materials, includes a substantially cylindrical container which has two openings for receiving oil and waste loading and unloading lines therein. The lines are connected within the container. A circular cover encloses the container and is quickly and securely fastened and unfastened from the container using a pair of L-shaped members which extend from the cover and cooperatively couple with a lip defined around the top of the container. Any oil and waste spilled from the connection is removed from the container when the lines are disconnected, or alternatively, a removal line with an auxiliary valve affixed thereto, is used to siphon the oil and waste from the container to the loading line. When the unloading line is removed from the opening in the container, a plug having vent holes for releasing gas from the container, is inserted into the opening. The plug and cover are attached to the loading line with an attachment cable. A lock having a hasp is received through passages defined in first and second tabs attached to the container and cover, respectively, for locking the cover to the container between transfers. Anchor cables can be attached to the container for securing the apparatus to stakes inserted into the ground. Further, the container may be equipped with a secondary containment bottom to provide additional protection against environmental contamination.

18 Claims, 11 Drawing Sheets

APPARATUS FOR CONTAINING OIL AND WASTE SPILLS AT A LOADING AND UNLOADING LINE CONNECTION

BACKGROUND

The present invention relates generally to containment of oil and waste spills, and more particularly, to an apparatus for containing oil and waste spilled from a loading and unloading line connection.

Environmental protection is one of the most important areas of concern facing our world today. A major source of pollution is the spilling and leaking of oil and waste at storage tank line connection areas. This is particularly destructive because if left unresolved the oil and waste will cause permanent destruction of the environment.

The embodiment of the invention provides an oil and waste spillage containment apparatus which is economical to produce, simple to use and effective in containing spillage.

When an oil and waste loading line is connected and disconnected from an unloading line there is usually unpreventable spillage from the lines, which results in the release of oil and waste contaminants into the environment. In addition, the oil and waste leak from the line connection during transfer and from the loading line connection end between transfers; thus, allowing the release of additional contaminants. Accordingly, because of growing environmental concerns, stringent statutory regulations have been enacted which prohibit oil and waste spills at storage tank loading and unloading line connections. These statutory regulations have greatly increased the desire for development of an economical and effective way of resolving this environmental problem. There is a need for a simple, economical and effective means of containing oil and waste spillage from loading and unloading line connections. However, until now, no such means have been developed to eliminate the release of oil and waste contaminants into the environment from these connections.

For the foregoing reasons, there is a need for an apparatus for containing oil and waste spill at a loading and unloading line connection.

SUMMARY

The embodiment of the invention is directed to an apparatus for satisfying the need of containing oil and waste spill at a loading and unloading line connection.

When a storage tank loading line is being connected to a removal source unloading line, for transferring oil and waste from the storage tank to a removal source, oil and waste pollutants frequently spill out of the lines and are deposited on the ground. This undesirable spillage of oil and waste into the environment is prevented with use of the present embodiment of the invention.

The storage tank loading line and the removal source unloading line are connected within a container. A cover is secured to the container, thereby enclosing the line connection and containing all oil and waste spilled during connection and transfer. Once the transfer is complete, the spilled oil and waste are removed from the container.

The embodiment of the invention relates to an apparatus for eliminating oil and waste spills into the environment from a loading and unloading line connection. More specifically, the apparatus comprises a substantially cylindrical container, made of non-corrosive and rustproof materials such as fiberglass (ie. fiber reinforced plastic), for collecting oil and waste. The container has a bottom and a cooperatively molded, generally perpendicular, upstanding sidewall; whereby, the oil and waste are retained in the container as it is spilled. The upstanding sidewall terminates in an outwardly extended lip around the upper perimeter of the upstanding sidewall. The lip has a plurality of notches defined therethrough. In addition, the container has first and second openings, approximately 180° apart, defined through the upstanding sidewall for receiving loading and unloading lines, respectively. Each line has a joined connector for connectively coupling the lines within the container.

The apparatus further comprises a circular cover, which has a skirt defined around its perimeter, made of non-corrosive and rustproof materials such as fiberglass. The cover cooperates with the lip to enclose the container. A plurality of L-shaped members extend from the skirt for sliding through the notches and rotatably coupling with the lip to fasten the cover to the container. A handle extends from the top of the cover for carrying the container and cover, placing the cover on the container, rotating the cover to couple the L-shaped members with the lip, and removing the cover from the container.

Also, included are first and second tabs, each having a passage defined therethrough, which extend from the container and the cover, respectively. A locking device for securing the cover to the container has a hasp which is received through the passages of the first and second tabs.

Further, the apparatus includes a plug, which has an expandable O-ring member defined around its outer edge, for filling the second opening when the unloading line is not received within the container. The plug has vent holes defined therethrough for releasing gas from the container. An attachment cable is attached on one end to the plug, extends through the handle and is attached on the other end to the loading line.

The foregoing elements comprising the apparatus for containing oil and waste are preferably used in conjunction with the following: a tank for storing oil and waste; a loading line, attached to the tank, for removing the oil and waste from the tank; a loading line connector joined to the loading line and received within the container; a shut-off valve, affixed to the loading line either on the interior or exterior of the container, for controlling removal of oil and waste from the tank; an unloading line, attached to a removal source, for receiving oil and waste from the loading line; and an unloading line connector, joined to the unloading line and received within the container, for coupling with the loading line connector.

In an alternative embodiment, the oil and waste are removed from the container through a removal line which extends from near the bottom interior of the container to the loading line. An auxiliary valve is affixed to the removal line for regulating the removal of the oil and waste from the container. When the shut off valve is closed and the auxiliary valve is open, the oil and waste are siphoned from the container, into the loading line, and then transferred to the removal source through the unloading line.

Another version of the invention includes a plurality of configurations which are integrally molded as part of the container. The configurations extend outwardly from the exterior of the upstanding sidewall. Each configuration has an aperture for receiving a anchor cable therethrough. The anchor cables are each attached to individual turn buckles which each have an anchor cable attached to individual auger shaped stakes. The stakes are placed into the ground for anchoring the apparatus.

Yet, another version of the invention includes a secondary containment bottom located between the bottom of the apparatus and the openings defined in the upstanding sidewall. A shaft, located interior the container, has an upper end located generally near the lip and a lower end that extends through the secondary containment bottom. A rod is received through the shaft wherein one end of the rod terminates generally near the bottom of the apparatus and the other end terminates with an attached cap for enclosing the upper end of the shaft.

As such, it is a first object of the embodiment of the invention to provide an apparatus which eliminates environmental pollution by containing oil and waste spill at a loading and unloading line connection.

It is a further object of the embodiment of the invention to provide an apparatus which solves current environmental problems prohibited by statute.

It is a further object of the embodiment of the invention to provide an apparatus which has a cover that is quickly and securely fastened to the container.

It is a further object of the embodiment of the invention to provide an apparatus which has a means for receiving oil and waste spilled from a loading and unloading line connection.

It is a further object of the embodiment of the invention to provide an apparatus which can enclose the loading and unloading line connection during transfer of oil and waste through the lines.

It is a further object of the embodiment of the invention to provide an apparatus which has an easily removable cover for accessing the loading and unloading line connection.

It is a further object of the embodiment of the invention to provide an apparatus which is easily assembled and economically feasible.

It is a further object of the embodiment of the invention to provide an apparatus having a container which can be used to permanently enclose the storage tank loading line connector when it is not connected to an unloading line.

It is a further object of the embodiment of the invention to provide an apparatus which is made of durable and long-lasting construction that resists corrosion and is rustproof.

It is a further object of the embodiment of the invention to provide an apparatus which releases gas from the container.

It is a further object of the embodiment of the invention to provide an apparatus which can be locked to prevent opening of the enclosed container.

It is a further object of the embodiment of the invention to provide an apparatus which can be anchored to prevent movement.

It is a further object of the embodiment of the invention to provide an apparatus which provides secondary containment means.

It is a final object of the embodiment of the invention to provide an apparatus which provides an effective means of removing the oil and waste collected within the container.

BRIEF DESCRIPTION OF THE DRAWINGS

These and other features, aspects, and advantages of the present invention will become better understood with regard to the following description, appended claims, and accompanying drawings where:

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

As best illustrated in FIGS. 1, 2A, 3A, 4A and 4B, the present embodiment of the invention relates to an apparatus 13 which is useful in containing oil and waste spill at a loading and unloading line connection 72.

Figure 3A:
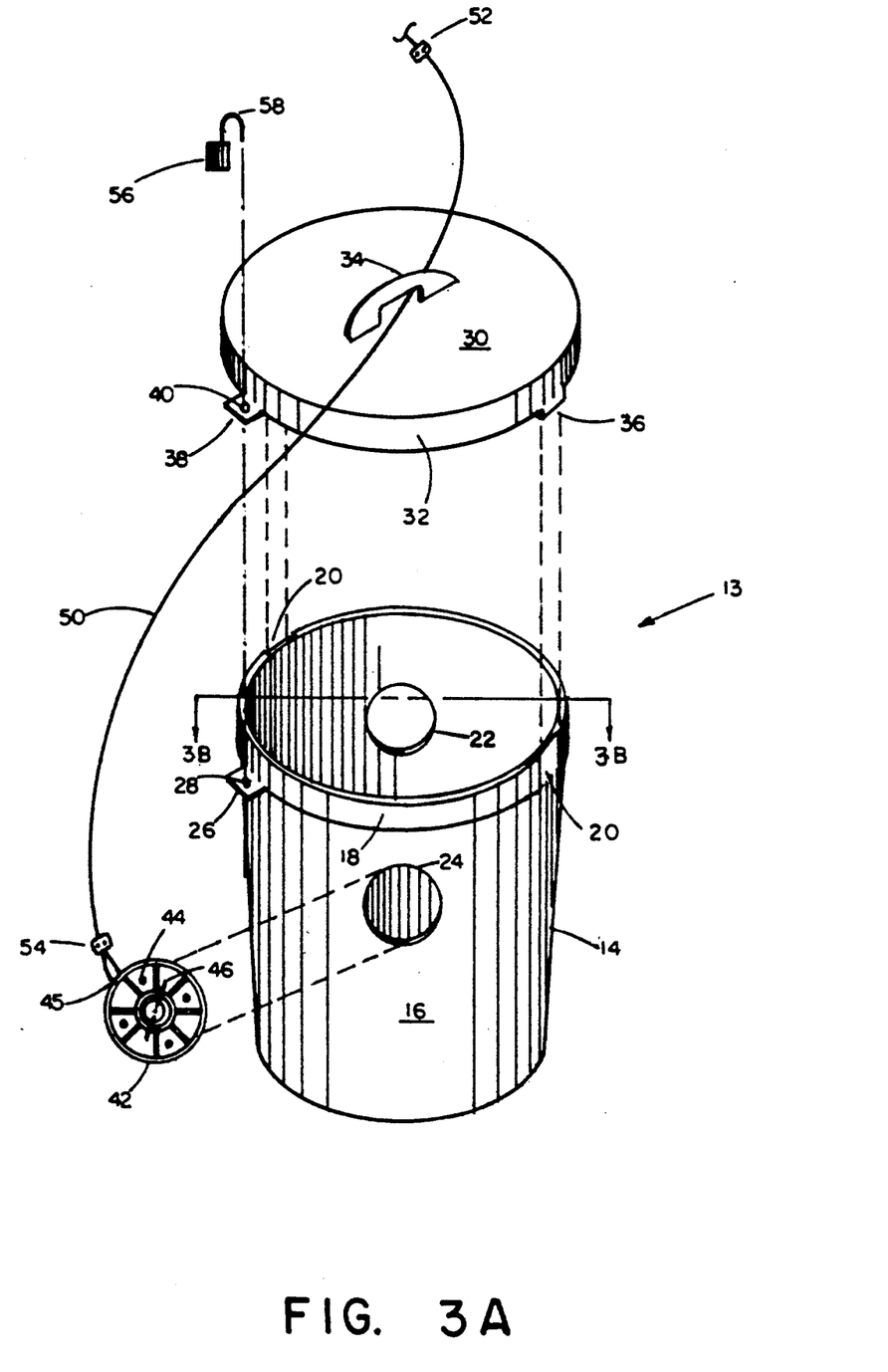
FIG. 3A shows an exploded view of the apparatus used to contain oil and waste spillage.
Figure 3B:
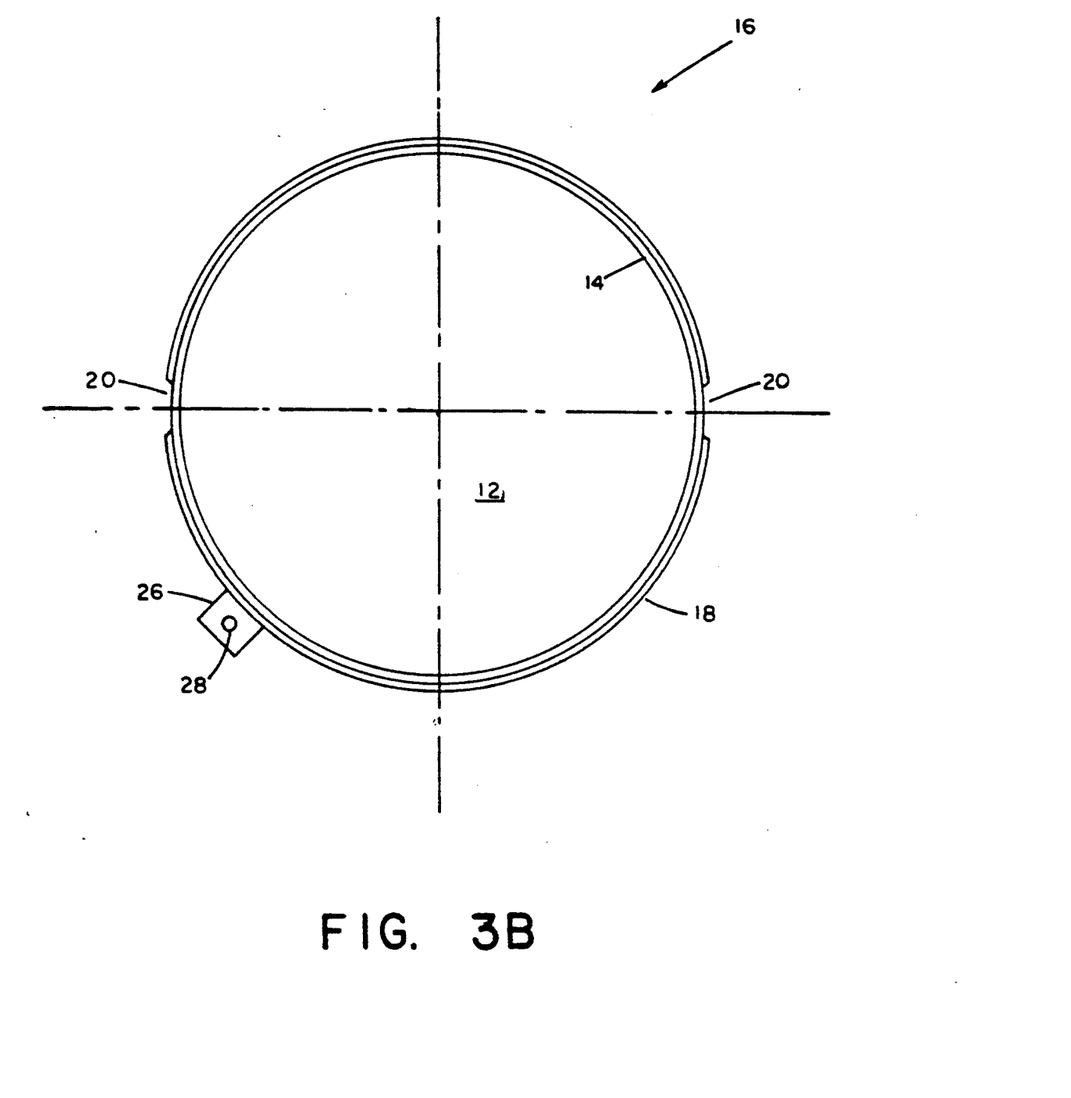
FIG. 3B shows a top plan view of the container along line 3B—3B of FIG. 3A.
Figure 4A:
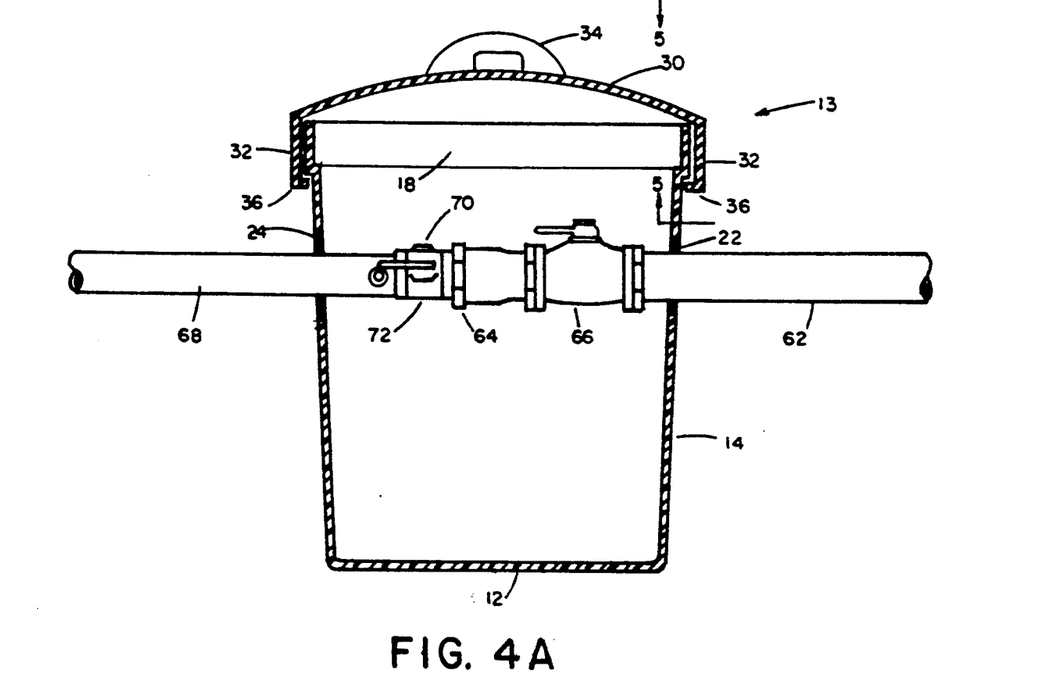
FIG. 4A shows a sectioned right side elevation view of the containment apparatus with the loading and unloading lines connected therein and the shut-off valve affixed to the loading line inside the container.
Figure 4B:
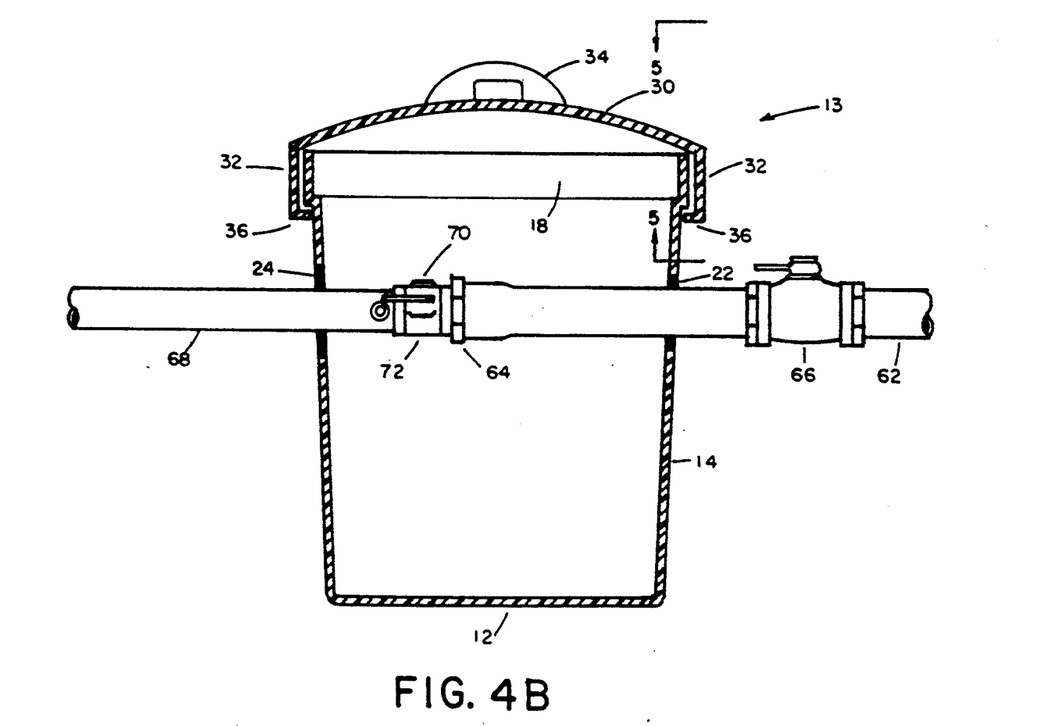
FIG. 4B shows a sectioned right side elevation view of the containment apparatus with the loading and unloading lines connected therein and the shut-off valve affixed to the loading line outside the container.

As shown in FIGS. 3B, 4A and 4B, the apparatus 13 includes a bottom 12. An upstanding sidewall 14, which is generally perpendicular, cooperates with the bottom 12; thus, the space defined inside the upstanding sidewall 14 forms a container 16 wherein the space is the interior of the container 16. As shown in FIG. 3A, the upstanding sidewall 14 terminates in an exterior lip 18 which defines the top of the container 16. The lip 18 extends outwardly from the perimeter of the container 16 and has a plurality of notches 20 defined therethrough parallel to the upstanding sidewall 14. The upstanding sidewall 14 has a first opening 22 and an opposed second opening 24 defined therethrough. The upstanding sidewall 14 has a first tab 26 extending generally perpendicular therefrom adjacent to the bottom of the lip 18, which is the side of the lip 18 nearest to the bottom 12. The first tab 26 extends outwardly and away from the interior of the container 16 and has a first passage 28 defined therethrough. The first passage 28 is generally located in the center of the tab 26 and is generally parallel to the upstanding sidewall 14.

The apparatus 13 further comprises, as best shown in FIGS. 3A, 4A, 4B and 5, a removable circular cover 30 which cooperates with the upstanding sidewall 14. The cover 30 has a skirt 32 which extends from the perimeter of the cover 30. In relation to when the cover 30 is placed on the container 16, the skirt 32 extends towards the bottom 12 and is generally parallel to the upstanding sidewall 14. The cover 30 has a handle 34 perpendicularly extended therefrom and centrally located on the top of the cover 30. The handle 34 is located exterior the container 16 and extends in the opposite direction of the skirt 32. Further, the handle 34 has a means, such as a hole defined therethrough, for accepting an attachment cable 50 therethrough.

Figure 5:
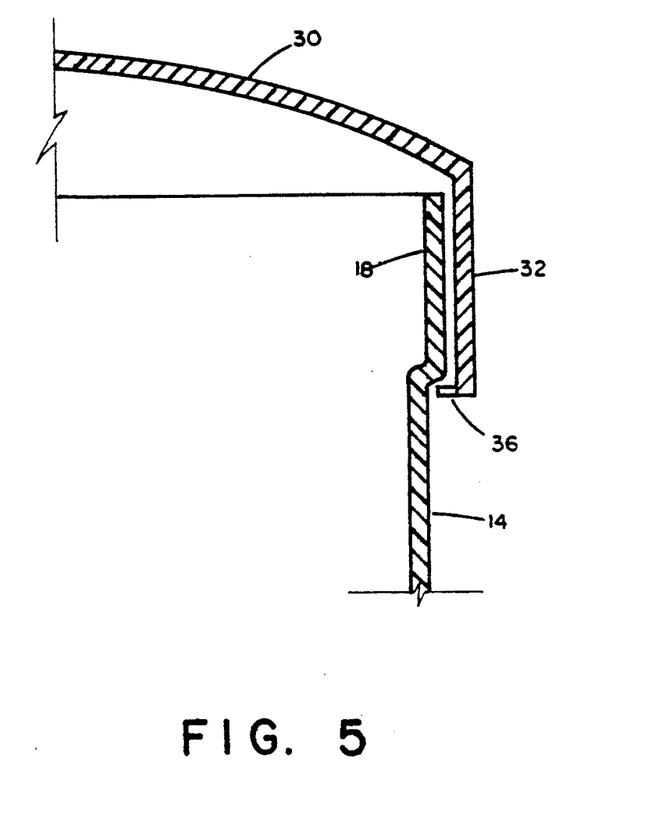
FIG. 5 shows a sectioned partial view, along line 5—5 of FIGS. 4A and 4B, of the L-shaped member extending from the skirt and coupling with the lip of the container.

As best shown in FIGS. 4A, 4B and 5, the skirt 32 has a plurality of L-shaped members 36 which extend from the skirt 32 towards the bottom 12 when the cover 30 is placed on the container 16. The skirt 32 has a second tab 38 which extends generally perpendicular therefrom and away from the cover 30, see FIG. 3A. The second tab 38 has a second passage 40 which is generally located in the center of the tab 38 and is generally parallel to the skirt 32. The second tab 38 is positioned adjacent to the first tab 26 and the passages 28, 40 are vertically aligned generally parallel to the upstanding sidewall 14 when the cover 30 is cooperatively fastened to the container 16. A hasp 58 attached to a locking device 56 is received through the passages 28, 40 when the tabs 26, 38 are adjacently positioned and the passages 28, 40 are aligned.

Figure 6:
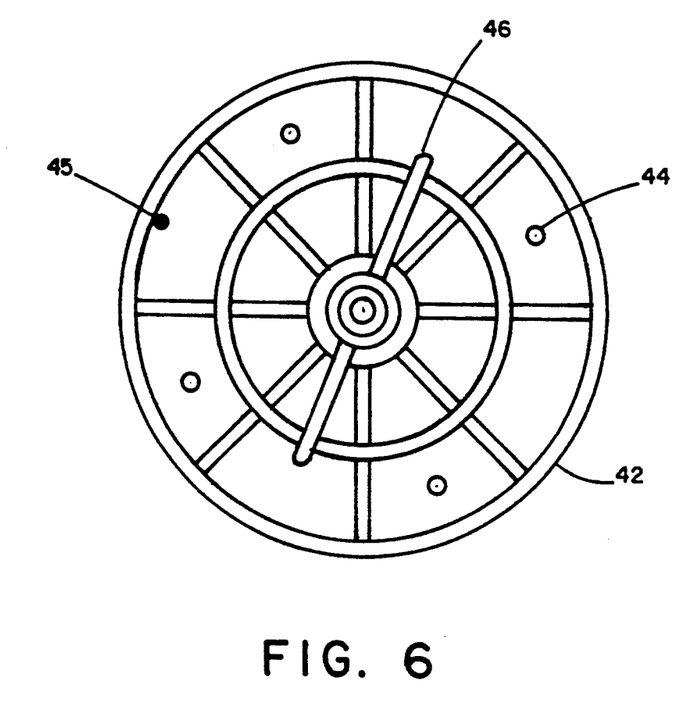
FIG. 6 shows a front view of the plug which includes the attachment hole, vent holes and plug tightening screw.
Figure 7:
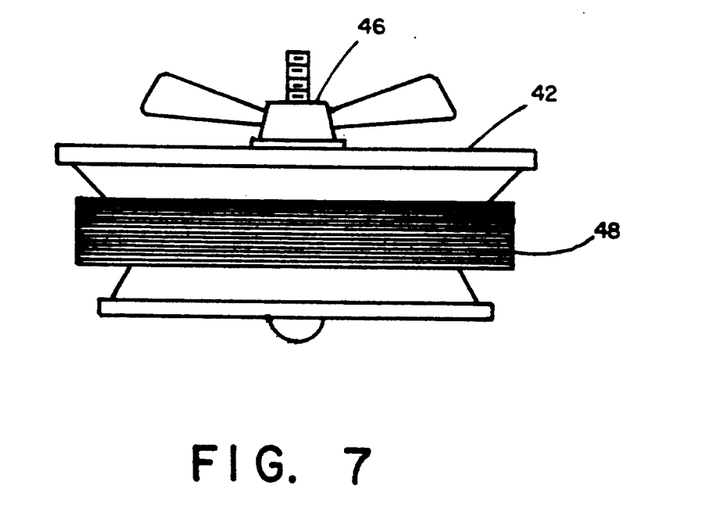
FIG. 7 shows a side elevation of the plug which includes the O-ring member and concave outer rim.

As best shown in FIGS. 1, 3A, 6 and 7, the apparatus 13 comprises a plug 42, preferably as is illustrated in U.S. Pat. No. 4,493,344, the disclosure of which is hereby incorporated by reference. The plug 42 is for engaging and filling the second opening 24. As illustrated in FIG. 6, the plug 42 preferably has a plurality of vent holes 44 cut therethrough which are generally perpendicular to the upstanding sidewall 14 when the plug 42 is engaged with the second opening 24. As shown in FIGS. 6 and 7, the plug 42 has an adjustable lateral force means 46 and an expandable 0-ring member 48; whereby, the adjustable lateral force means 46 is used for tightly engaging the 0-ring member 48 with the upstanding sidewall 14 after the plug 42 is inserted into the second opening 24. Additionally, the plug 42 has an attachment hole 45 cut therethrough for connecting an attachment cable 50 to the plug 42. The attachment cable 50 is attached at one end with a first keeper 52 to the loading line 62, extends through the handle 34 and is attached at the other end with a second keeper 54 to the plug 42.

Figure 2A:
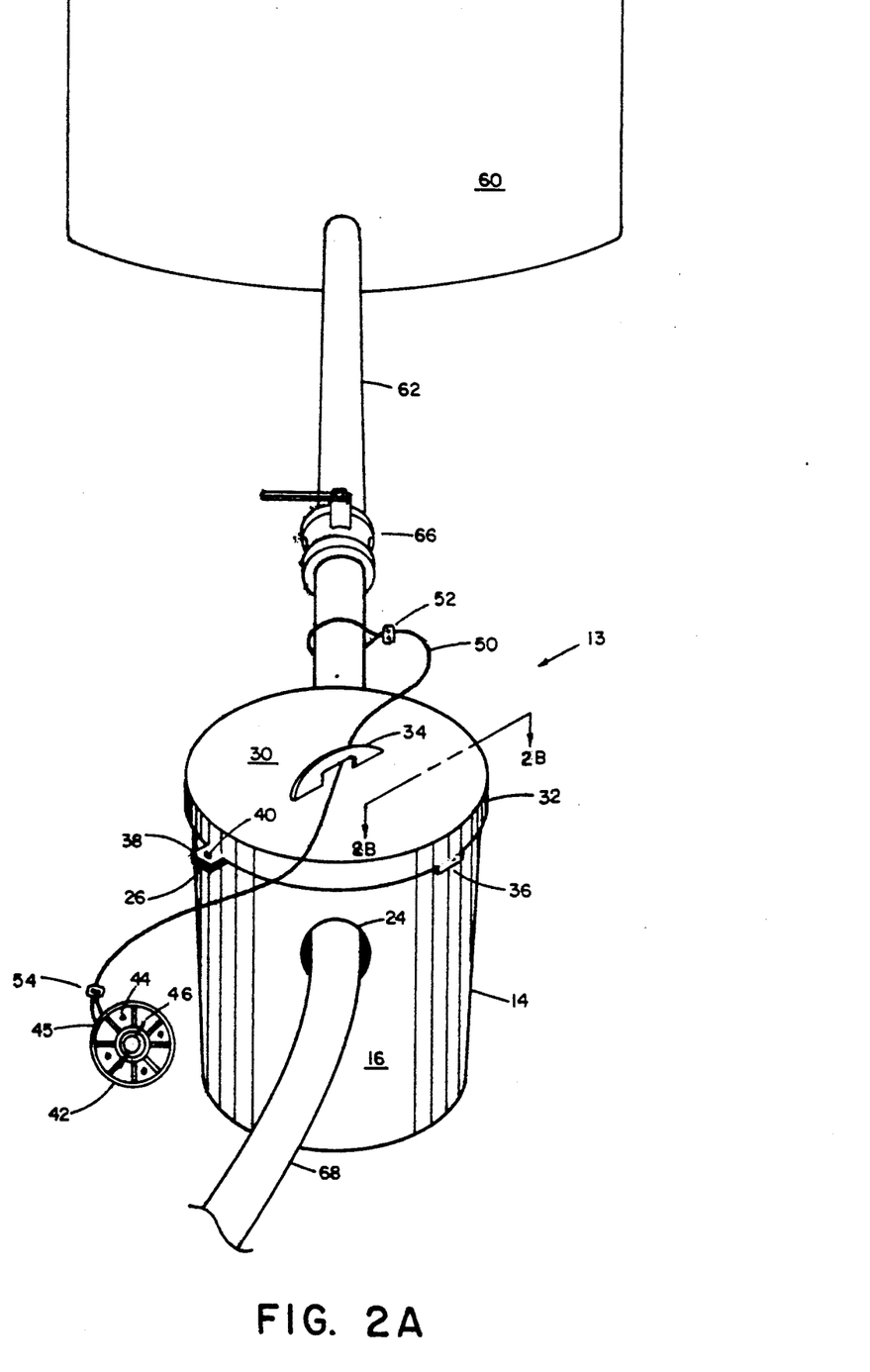
FIG. 2A shows a front perspective view of the present embodiment of the invention for containing oil and waste spills at a storage tank line connection.

As best shown in FIG. 2A, an oil and waste storage tank 60 has an attached loading line 62. As shown in FIGS. 4A and 4B, the loading line 62 is joined to a loading line connector 64 wherein the connector 64 and part of the loading line 62 are received within the container 16 via the first opening 22. The loading line 62 has a shut-off valve 66 affixed thereto either interior or exterior the container 16. An unloading line 68, attached to a removal source having a pumping means, is joined to an unloading line connector 70, wherein the connector 70 and part of the line 68 are received within the container 16 via the second opening 24. The unloading line connector 70 is coupled with the loading line connector 64 wherein the connection 72 is located inside the container 16.

Figure 8A:
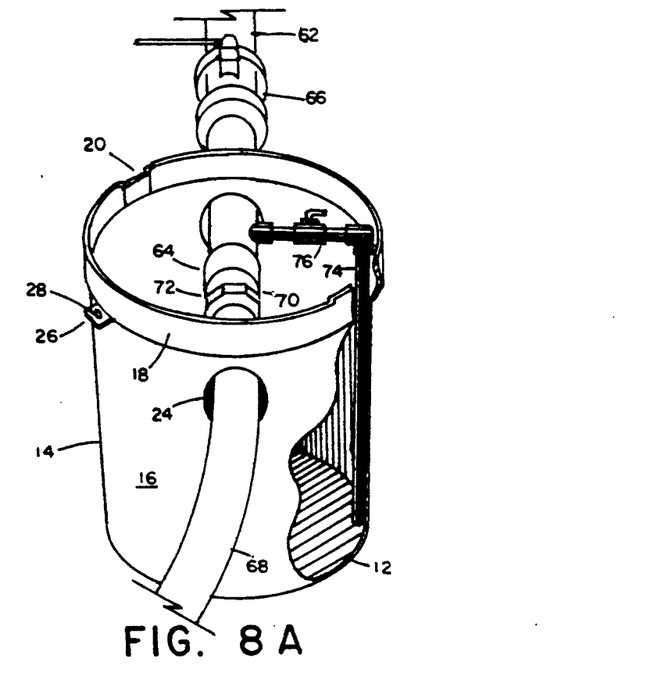
FIG. 8A shows a partially broken away front perspective view of an alternative embodiment of the invention which includes the removal line and auxiliary valve, each located inside the container.
Figure 8B:
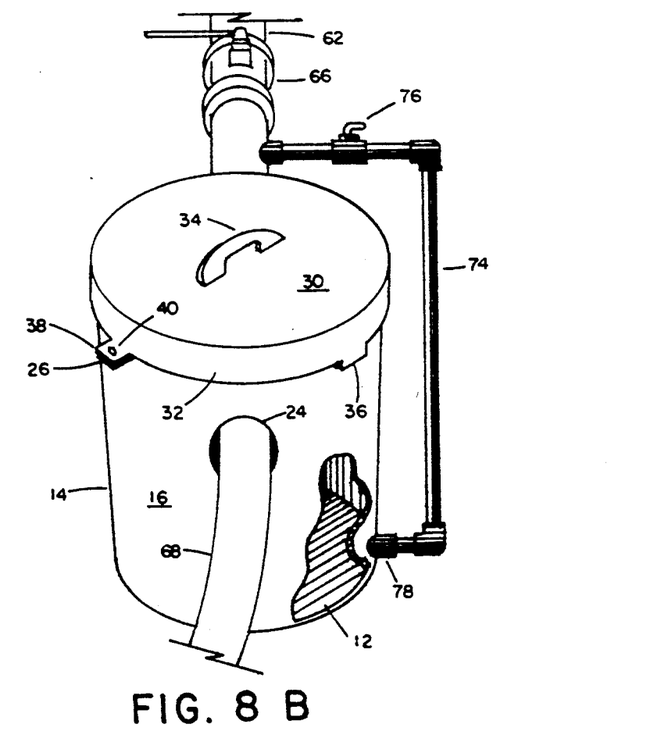
FIG. 8B shows a partially broken away front perspective view of an alternative embodiment of the invention which includes the removal line and auxiliary valve, each located outside the container.

As illustrated in FIGS. 8A and 8B, an alternative embodiment of the invention includes a removal line 74 with one end located near the interior bottom 12, preferably in close proximity to where the upstanding sidewall 14 cooperates with the bottom 12, and a second end located near the upper portion of the container 16. The removal line 74 is fitted at the second end to the loading line 62, either interior or exterior the container 16, between the shut-off valve 66 and the loading line connector 64. Thus, the removal line 74 is a conduit for transferring oil and waste from the container 16 to the loading line 62. The removal line 74 has an auxiliary valve 76 affixed thereto for controlling the flow of liquid through the removal line 74.

Figure 9:
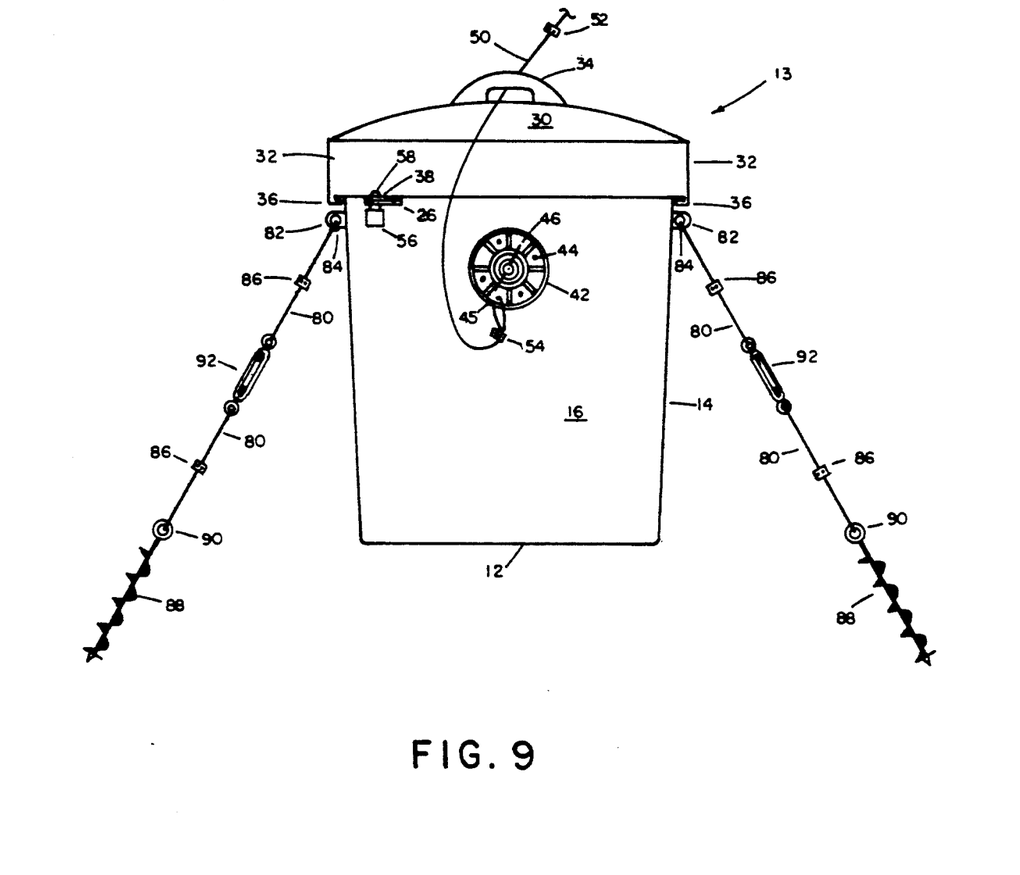
FIG. 9 shows a front elevation view of an alternative embodiment of the invention which includes the configurations, anchor cables, turn buckles and auger shaped stakes.

As illustrated in FIG. 9, the apparatus 13 includes a plurality of configurations 82 integrally molded to the upstanding sidewall 14. Each configuration 82 has an aperture 84 defined therein for receiving an anchor cable 80 therethrough. The anchor cable 80 is attached to a turn buckle 92. The turn buckle 92 is attached with another anchor cable 80 to an auger shaped stake 88. The stake 88 is inserted into the ground for anchoring the apparatus 13.

Figure 10A:
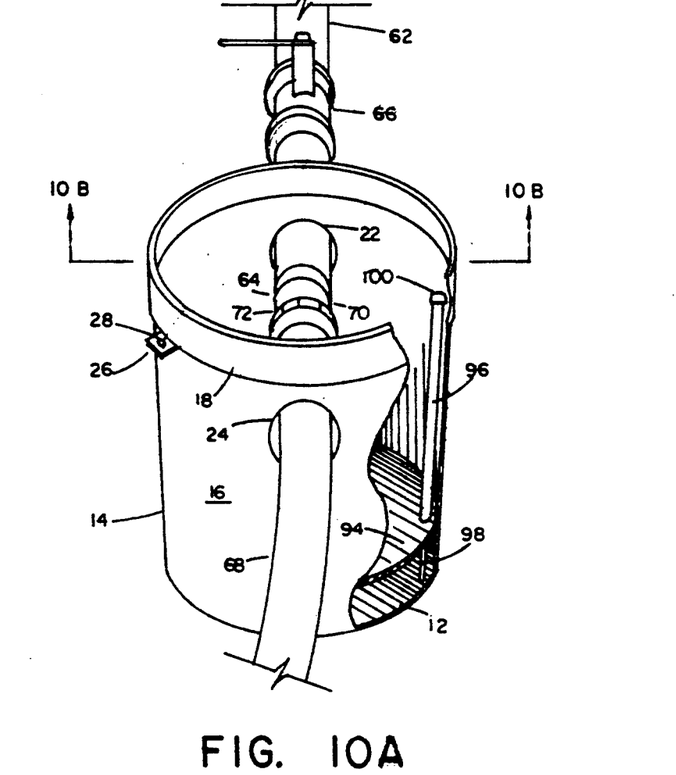
FIG. 10A shows a partially broken away front perspective view of an alternative embodiment of the invention which includes the secondary containment bottom, shaft, rod and cap.
Figure 10B:
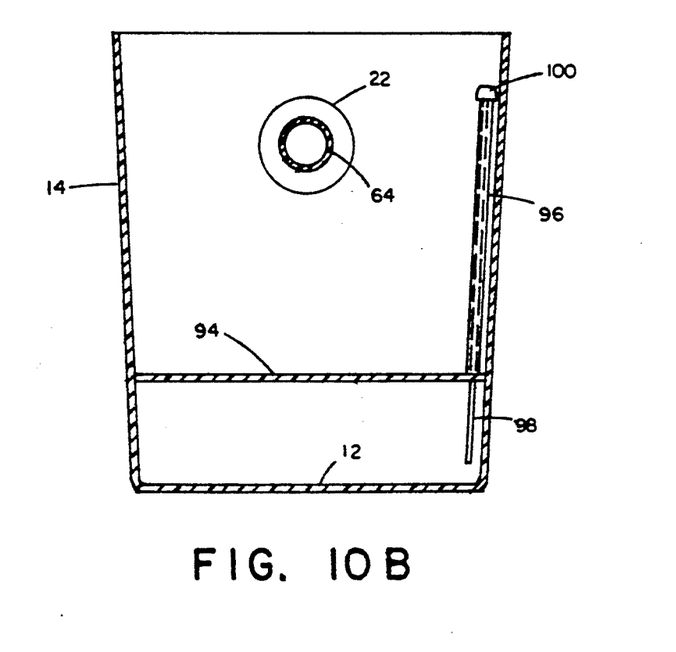
FIG. 10B shows a sectioned front elevation view, along line 10B—10B of FIG. 10A, of the container with the secondary containment bottom, shaft, rod and cap.

As illustrated in FIGS. 10A and 10B, the apparatus 13 includes a secondary containment bottom 94 located between the bottom 12 of the apparatus 13 and the openings 22, 24 defined in the upstanding sidewall 14. A shaft 96, located interior the container 16, has an upper end located generally near the lip 18 and a lower end that extends through the secondary containment bottom 94. The upper end of the shaft 96 is positioned a sufficient distance from the upstanding sidewall 14 to allow placement of a cap 100 onto the end of the shaft 96. A rod 98 is received through the shaft 96 wherein one end of the rod 98 terminates generally near the bottom 12 and the other end is attached to a cap 100 for enclosing the upper end of the shaft 96.

As shown in FIGS. 3A, 4A and 4B, the bottom 12, upstanding sidewall 14, lip 18 and first tab 26 are shown as a single fiberglass, i.e., fiber reinforced plastic, cylinder which has been molded at one time as a single piece to form a container 16. The bottom 12 is a substantially circular plane and the upstanding sidewall 14 is a substantially cylindrical column cooperatively molded to the bottom 12 forming the container 16. It is preferable that the bottom 12, upstanding sidewall 14, lip 18 and first tab 26 be made of non-corrosive and rustproof construction, such as fiberglass or other suitable materials.

Figure 2B:
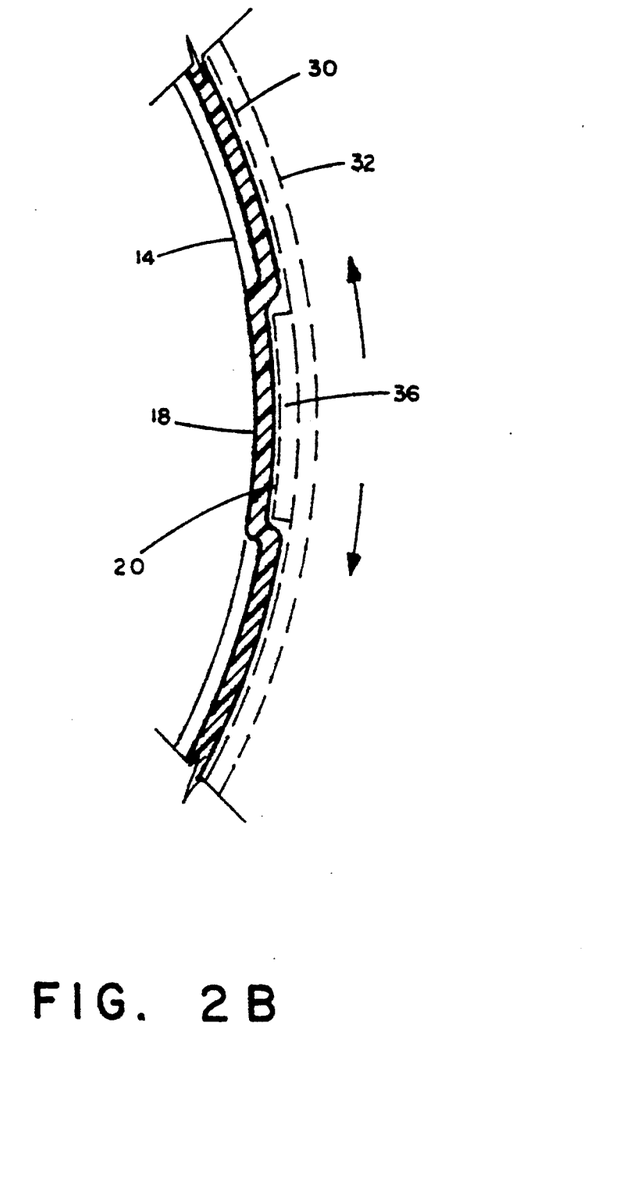
FIG. 2B shows a sectioned partial top plan view of the cover and container, along line 2B—2B of FIG. 2A, including the L shaped member and notch.

The lip 18 provides structural stability to the container 16, as well as, a means for fastening the cover 30 to the container 16. The lip 18 may have rounded edges for ease in accepting the cover 30. The lip 18 preferably has two notches 20 defined therethrough generally parallel to the upstanding sidewall 14, each notch 20 is molded as part of the single piece container 16. The notches 20 are positioned on opposite sides of the container 16, approximately 180° apart, and each has a sufficient width for slidably accepting one L-shaped member 36 therethrough when the cover 30 is placed on the container 16, see FIG. 2B.

The first tab 26 is a preferably square or other suitable shape which has the first passage 28 cut therethrough. The first passage 28 is preferably circular or of other suitable shape with sufficient size to receive the hasp 58 of the locking device 56 therethrough.

The first and second openings 22, 24 are oppositely cut, approximately 180° apart, through the upstanding sidewall 14, preferably in the upper portion of the upstanding sidewall 14 near the lip 18 and away from the bottom 12. The openings 22, 24 are preferably circular and have diameters of sufficient size to receive the loading line 62 and joined loading line connector 64 through the first opening 22 and the unloading line 68 and joined unloading line connector 70 through the second opening 24; however, various other sizes and shapes of openings 22, 24 may be suitable. In a preferred embodiment of the apparatus 13, the first opening 22 is preferably about four and three quarter inches (4¾″) in diameter and the second opening 24 is preferably about six inches (6″) in diameter.

As shown in FIGS. 3A, 4A and 4B the circular cover 30, skirt 32, handle 34, L-shaped members 36 and second tab 38 are constructed of fiberglass, ie., fiber reinforced plastic, and have been made as a single piece. It is preferable that the handle 34 be integrally attached to the cover 30; however, the handle 34 may alternatively be attached using fasteners such as bolts which are covered with fiberglass to prevent rust and corrosion of the fastener. It is preferable that the cover 30, skirt 32, handle 34, L-shaped members 36 and second tab 38 be constructed of noncorrosive and rustproof materials, such as fiberglass or other suitable materials.

The cover 30 is preferably circular or other suitable shape for enclosing the container 16 and has a skirt 32 which cooperatively fits around the perimeter of the lip 18. The skirt 32 has an inside diameter slightly greater than the perimeter of the lip 18; thus, allowing the skirt 32 to closely fit around the perimeter of the lip 18 when the cover 30 is placed on the container 16. The cover 30 preferably cooperates with the container 16, without the use of a hinge, to keep out rain, debris and wildlife, see FIG. 5.

The second tab 38 is preferably square or other suitable shape which has the second passage 40 cut therethrough. The second passage 40 is preferably circular or any other suitable shape with sufficient size to receive the hasp 58 of the locking device 56 therethrough. The handle 34 located on the top of the cover 30, is exterior the container 16 and preferably arch shaped or other suitable design for grasping the cover 30. The handle 34 has an accepting means such as an attachment hole 45 defined therethrough for accepting an attachment cable 50 therethrough.

As shown in FIGS. 4A and 4B, the L shaped members 36, in relation to when the cover 30 is positioned on the container 16, include extensions of the skirt 32 which extend towards the bottom 12, right-angled elbows located at the bottom of the lip 18 which extend in the direction of the upstanding sidewall 14, and extensions from the right-angle elbows toward the upstanding sidewall 14 which terminate adjacent to the upstanding sidewall 14; thus, forming the L-shaped members 36. There are preferably two L-shaped members 36 positioned on opposite sides of the cover 30, approximately 180° apart, with identical orientation as the notches 20. Although one L-shaped member 36 and notch 20 is satisfactory, in the interest of symmetry and additional insurance, it is preferred that a plurality, preferably two, L-shaped members 36 and notches 20 be utilized and disposed oppositely approximately 180° apart.

The plug 42 has a plurality of vent holes 44 cut therethrough for releasing gas from the container 16 and an attachment hole 45 cut therethrough for connecting the attachment cable 50 thereto. Although a single vent hole 44 would suffice, a plurality, such as four shown in FIG. 6, are preferred for insurance of adequate ventilation. Alternatively, similar means for releasing gases from the container 16 can be utilized such as a hole or opening defined through the container 16 or cover 30. The plug 42 is preferably circular to allow complementary insertion into the second opening 24.

Figure 1:
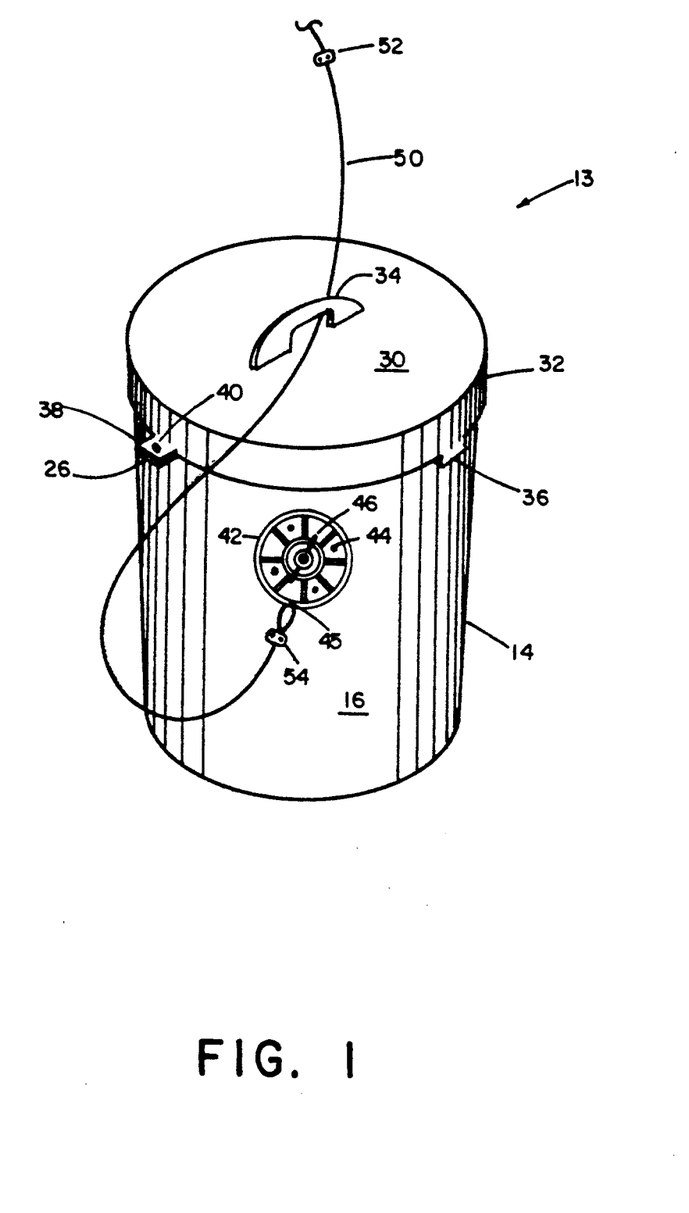
FIG. 1 shows a front perspective view of the apparatus used to contain oil and waste spillage.

As best shown in FIGS. 1 and 3A, the attachment cable 50 is made from woven strands of flexible steel and or other suitable materials and is coated with vinyl or other similar material which protects against rust and corrosion. The attachment cable 50 is attached at one end to the loading line 62 and at the other end to the plug 42 with first and second keepers 52 and 54, respectively, such as clamps.

The locking device 56 having a hasp 58 is preferably a padlock or other similar locking means that is receivable through the first and second passages 28, 40 for securing the cover 30 to the container 16.

The tank 60, shown in FIG. 2A, is that commonly used to store liquids, including oil and waste. The loading line 62 is a conduit such as a pipe or a hose and is attached to the tank 60 by weld, thread, flange or other similar means. The loading line connector 64 is preferably a threaded nipple or other connector such as a collar or valve body which is preferably quick coupled to the loading line 62. The shut-off valve 66 may be any valve engineered by common accepted engineering standards for transporting oil and various waste products through the valve 66. The shut-off valve 66 is affixed to the loading line 62 by weld, thread, flange or other similar means. If the shut-off 68 is located inside the container 16, it is preferred that the valve 66 be affixed to the loading line 62 after the line 62 is inserted through the first opening 22, rather than increasing the diameter of the first opening 22 to accommodate passage of the valve 66 therethrough. However, either method of positioning the shut-off valve 66 within the container 16 will be sufficient.

The unloading line 68 is a hose or similar conduit for transferring the oil and waste. The unloading line connector 70 is preferably a threaded nipple or other connector such as a collar or valve body which is preferably quick coupled to the unloading line 68.

As shown in FIG. 8A and 8B, the removal line 74 is a conduit such as a hose or segments of pipe connected with elbow joints. The removal line 74 is preferably located within the container 16 and is attached to the upstanding sidewall 14 with fiberglass, see FIG. 8A. Alternatively, the removal line 74 may be connected to the exterior of the upstanding sidewall 14, adjacent to where the bottom 12 cooperates with the upstanding sidewall 14, with a collar 78 that extends through the sidewall 14 and is preferably affixed to the sidewall 14 with fiberglass, see FIG. 8B. The removal line 74 is connected to the loading line 62 by a connecting means such as a threaded nipple, K.C. nipple or other suitable means. Affixed to the removal line 74 by means of threaded inline connection is the auxiliary valve 76.

As shown in FIG. 9, preferably two auger shaped stakes 88 are used for anchoring the apparatus 13. The stakes 88 are made of steel or other rigid materials capable of being screwed into the soil and have a loop 90 or similar means for fixing the anchor cables 80 thereto.

The configurations 82 are preferably molded to the upstanding sidewall 14 as part of the single piece construction made of fiberglass. The configurations 82 have apertures 84 cut therethrough which are preferably circular or any other suitable shape for receiving the anchor cable 80 therethrough.

The anchor cables 80 are made from woven strands of flexible steel and or other suitable materials and are coated with vinyl or other similar material which protects against rust and corrosion. An anchor cable 80 is received through the aperture 84 and is fastened to a turn buckle 92 with a cable clamp 86. Another anchor cable 80 is received through the loop 90 and is fastened to the turn buckle 92 with another cable clamp 86. The turn buckle 92 is that commonly used for tightening cables attached between two points.

The secondary containment bottom 94 is a substantially circular plane which is cooperatively molded within the interior of the container 16 and is generally parallel to the bottom 12. The secondary containment bottom 94 is made of fiberglass and is molded to the container 16 as part of a single piece. The shaft 96, which has a central passage defined therethrough from the upper end to the lower end, is preferably a polyvinyl chloride pipe or similar conduit for allowing passage of a rod 98 therethrough. The shaft 96 is threaded around its upper end for coupling with a screw cap 100. The rod 98 is made of plastic, metal, wood or other similar material which is receivable through the shaft 96 for communicating within the space defined between the bottom 12 and the secondary containment bottom 94. The rod 98 is used as a dipstick for determining whether oil and waste have leaked through the secondary containment bottom 94 to the bottom 12. The rod 98 terminates in a screw cap 100, which is preferably connected to the rod 98 with an adhesive such as glue, for coupling with the threaded end of the shaft 96.

The present embodiment of the invention is preferably used as is shown in FIG. 2A, which includes a tank 60 commonly used to store liquids such as oil and waste. The tank 60 is unloaded via a conduit system which includes a loading line 62 and joined connector 64, coupled with a removal source unloading line 68 and joined connector 70. The unloading line 68 and connector 70 are generally stored on a removal truck or other means of transferring liquids.

In order to prevent the spillage of oil and waste during the transfer, the loading line 62 and connector 64 are inserted through the first opening 22 of the container 16, and the unloading line 68 and connector 70 are inserted through the second opening 24 of the container 16. The two connectors 64, 70 are coupled together within the container 16, see FIGS. 4A and 4B. The cover 30 is placed onto the container 16 by grasping the handle 34 and sliding the L-shaped members 36 through the notches 20. The cover 30 is then fastened to the container 16 by rotating the cover 30, with the handle 34, and moving the L-shaped members 36 such that the members 36 are positioned next to the bottom of the lip 18. The shut-off valve 66 is opened and closed for controlling the transfer of liquid from the tank 60, through the lines 62, 68 and to the removal source.

Once the transfer is complete, the cover 30 is unfastened by grasping the handle 34, rotating the cover 30 and aligning the L-shaped members 36 with the notches 20; wherein, the cover 30 is lifted from the container 16. The line connectors 64, 70 are uncoupled inside the container 16 which allows any spillage from the lines 62, 68 to be collected in the container 16. After the unloading line connector 70 is uncoupled from the loading line connector 64 any oil and waste collected within the container 16 is removed by placing the connector 70 in the interior bottom of the container 16 and pumping out the oil and waste through the unloading line 68. The unloading line 68 is then placed on the removal truck.

The cover 30 is again placed onto the container 16 and fastened by rotating the cover 30, with the handle 34, and moving the L-shaped members 36 such that the members 36 are positioned next to the bottom of the lip 18. As best shown in FIGS. 1 and 3A, the plug 42 is inserted into the second opening 24 and tightly sealed by turning the tightening screw 48, which expands the O-ring member 48 to engage the sidewall 14. The hasp 58 of the locking device 56 is received through the adjacently aligned passages 28, 40 for locking the cover 30 to the container 16 between transfers.

The apparatus 13 is left with the loading line 62 and joined connector 64 received through the first opening 22 which allows continuous protection against leakage from the loading line connector 64. The use of auger shaped stakes 88 screwed into the ground and anchor cables 80 affixed thereto and to the container 16 provide added stability to the apparatus 13. Further, the bottom 12 and the upstanding sidewall 14 proximal to the bottom 12 may be placed below the surface of the ground to provide stability to the container 16.

In an alternative embodiment of the invention, as shown in FIGS. 8A and 8B, while the lines 62, 68 remain coupled inside the container 16, removal of the oil waste collected within the container 16 is initiated by opening the auxiliary valve 76 affixed to the removal line 74 and closing the shut-off valve 66 affixed to the loading line 62; whereby, the oil and waste are siphoned from the container 16 through the removal line 74 and into the loading line 62 for removal through the unloading line 68.

In another version of the invention, as shown in FIGS. 10A and 10B, a secondary containment bottom 94 is provided to give additional protection against environmental spills. The rod 98 is used to determine if any oil or waste has leaked through the secondary containment bottom 94 to the bottom 12 of the container 16. The rod 98 is located inside the shaft 98 and has a threaded cap 100 mounted on one end for screwing onto the upper end of the shaft 98; thus enclosing the upper end of the shaft 98 when the cap 100 is coupled with the shaft 98.

The previously described versions of the invention have many advantages, including a simple and economic way of containing oil and waste spillage through use of the container 16 and cooperating cover 30. The molded fiberglass construction affords that the apparatus 13 is simple and economical to construct.

Another advantage of the embodiment of the invention is that the cover 30 is quickly and securely fastened and unfastened from the container 16 allowing easy access to the line connection 72. This is accomplished with use of the L-shaped members 36 and cooperating lip 18 with notches 20.

Further advantages of the embodiments of the invention are that the apparatus 13 is securely stabilized with the use of anchor cables 80 and stakes 88, and that the apparatus 13 provides added protection against environmental contamination with the use of a secondary containment bottom 94.

In addition, the apparatus 13 is advantageous in providing an effective way of complying with current statutory regulations by containing and removing the oil and waste spill within the container 16 and preventing its release into the environment. Further, the non-corrosive and rustproof materials used in construction enhance the effectiveness of the apparatus 13.

While the preferred use of the present version of the invention is for an oil and waste storage tank 60 loading and unloading line connection 70, it is obvious that the apparatus 13 has many applications for containing various spills at numerous types of line connections. Therefore, the foregoing descriptions of specific embodiments of the present invention have been presented for purposes of illustration and description. They are not intended to be exhaustive or to limit the invention to the precise forms disclosed and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for containing oil and waste spills, the apparatus comprising:
   (a) a container for collecting the oil and waste, said container having a bottom and an upstanding sidewall, whereby the oil and waste are retained in said container as they are spilled,
   (b) said container having first and second openings for receiving loading and unloading lines and joined connectors therein;
   (c) a cover for closing said container;
   (d) a closing means for closing the opening used in receiving the unloading line when the unloading line is not received within said container; and
   (e) a releasing means for releasing gas from said container, said releasing means is located in said closing means.

2. An apparatus as recited in claim 1, wherein: the first and second openings are defined through the upstanding sidewall of said container and are located opposite positions.

3. An apparatus as recited in claim 1, wherein: said releasing means includes said closing means having a vent hole defined therethrough.

4. An apparatus as recited in claim 1, further comprising:
   a handle for grasping said cover, said handle extends from said cover.

5. An apparatus as recited in claim 1, further comprising:
   a locking means for locking said cover to said container.

6. An apparatus as recited in claim 1, further comprising:
   a tank for storing the oil and waste;
   a loading line for removing the oil and waste from said tank, said loading line is attached to said tank;
   a loading line connector joined to said loading line, said loading line connector is received within said container;
   an unloading line for receiving the oil and waste from said loading line, said unloading line is attached to an oil and waste removal source;
   an unloading line connector for coupling with said loading line connector, said unloading line connector is joined to said unloading line and is received within said container; and
   a shut-off valve for controlling removal of the oil and waste from said tank through said loading line, said shut-off valve is affixed to said loading line 7. An apparatus as recited in claim 1, further comprising:
   anchoring means for anchoring the apparatus to the ground.

8. An apparatus as recited in claim 1, wherein: said closing means for closing the opening used in receiving the unloading line is a plug.

9. An apparatus as recited in claim 1, further comprising: fastening means for fastening said cover to said container.

10. An apparatus as recited in claim 9, wherein:
    said fastening means includes said container and said cover having integrally molded means for cooperatively fastening said cover to said container.

11. An apparatus for containing oil and waste spills, the apparatus comprising:
    (a) a container for collecting the oil and waste, said container is substantially cylindrical having a bottom and an upstanding sidewall, whereby the oil and waste are retained in said container as they are spilled;
    (b) said container having first and second openings defined therethrough for receiving loading and unloading lines with joined connectors therein, respectively;
    (c) said container being constructed of non-corrosive and rustproof materials;
    (d) a lip having a plurality of notches, said lip is defined around the perimeter of the upstanding sidewall of said container;
    (e) a cover for enclosing said container, said cover is circular and is constructed of non-corrosive and rustproof materials;
    (f) a plurality of L-shaped members for sliding through the notches and rotatably coupling with said lip to fasten said cover to said container, said L-shaped members extend from said cover;
    (g) a handle for grasping said cover, said handle is located exterior said container and extends from said cover;
    (h) a first tab extending from said container;
    (i) a second tab extending from said cover;

(j) said first and second tabs each having a passage defined therethrough for receiving a hasp attached to a locking device to secure said cover to said container;

(l) a plug for filling the second opening when the unloading line is not received therethrough;

(m) releasing means for releasing gas from said container; and (n) attaching means for attaching said plug and said cover to the loading line.

12. An apparatus as recited in claim 11, further comprising:

a tank for storing the oil and waste;

a loading line for removing the oil and waste from said tank, said loading line is attached to said tank;

a loading line connector joined to said loading line, said loading line connector is received within said container;

an unloading line for receiving the oil and waste from said loading line, said unloading line is attached to an oil and waste removal source;

an unloading line connector for coupling with said loading line connector, said unloading line connector is joined to said unloading line and is received within said container; and a shut-off valve for controlling removal of the oil and waste from said tank through said loading line, said shut-off valve is affixed to said loading line.

13. An apparatus for containing oil and waste spills, the apparatus comprising:

(a) a container for collecting the oil and waste, said container having a bottom and an upstanding sidewall, whereby the oil and waste are retained in said container as they are spilled, (b) said container having first and second openings for receiving loading and unloading lines and joined connectors therein;

(c) a cover for closing said container;

(d) a closing means for closing the opening used in receiving the unloading line when the unloading line is not received within said container;

(e) a releasing means for releasing gas from said container; and (f) an attaching means for attaching said closing means and said cover to the loading line.

14. An apparatus as recited in claim 13, wherein:

said attaching means includes an attachment cable having a first end and a second end, the first end is attached to the loading line and the second end is attached to said closing means; said attachment cable passes through an opening defined on said cover.

15. An apparatus for containing oil and waste spills, the apparatus comprising:

(a) a container for collecting the oil and waste, said container having a bottom and an upstanding sidewall, whereby the oil and waste are retained in said container as they are spilled, (b) said container having first and second openings for receiving loading and unloading lines and joined connectors therein;

(c) a cover for closing said container;

(d) a releasing means for releasing gas from said container;

(e) a closing means for closing the opening used in receiving the unloading lien when the unloading line is not received within said container; and (f) a removing means for removing the oil and waste from said container to the loading line;

wherein said removing means includes:

a removal line for carrying oil and waste from said container to the loading line; and an auxiliary valve for regulating the removal of the oil and waste from said container, said auxiliary valve is affixed to said removal line.

16. An apparatus for containing oil and waste spills, the apparatus comprising:

(a) a container for collecting the oil and waste, said container having a bottom and an upstanding sidewall, whereby the oil and waste are retained in said container as they are spilled, (b) said container having first and second openings for receiving loading and unloading lines and joined connectors therein;

(c) a cover for closing said container;

(d) a releasing means for releasing gas from said container;

(e) a closing means for closing the opening used in receiving the unloading line when the unloading line is not received within said container; and (f) an anchoring means for anchoring the apparatus to the ground, said anchoring means includes a plurality of anchor stakes inserted in the ground, a plurality of anchor cables and means for attaching the anchor cables to the apparatus and to the stakes.

17. An apparatus for containing oil and waste spills, the apparatus comprising:

(a) a container for collecting the oil and waste, said container having a bottom and an upstanding sidewall, whereby the oil and waste are retained in said container as they are spilled, (b) said container having first and second openings for receiving loading and unloading lines and joined connectors therein;

(c) a cover for closing said container;

(d) a releasing means for releasing gas from said container;

(e) a closing means for closing the opening used in receiving the unloading line when the unloading line is not received within said container;

(f) a secondary containment bottom located inside said container, said secondary containment bottom is generally perpendicular to the upstanding sidewall and is located between the bottom and the first and second openings; and (g) inspecting means for inspecting said secondary containment bottom for leakage;

wherein said inspecting means includes;

a shaft, positioned inside said container, having an upper end located generally near said cover and a lower end that extends through said secondary containment bottom.

18. An apparatus as recited in claim 17, wherein said inspecting means further includes:

a rod which passes through said shaft and extends from the bottom of said container to the upper end of said shaft; and a cap for enclosing the upper end of said shaft.

* * * * *